(12) United States Patent
Yuan et al.

(10) Patent No.: US 9,485,193 B2
(45) Date of Patent: Nov. 1, 2016

(54) METHOD AND APPARATUS FOR ALLOCATING NETWORK MEDIUM DATA RESOURCES

(71) Applicant: Tencent Technology (Shenzhen) Company Limited, Shenzhen (CN)

(72) Inventors: Yefeng Yuan, Shenzhen (CN); Shenxing Yuan, Shenzhen (CN); Yu Huang, Shenzhen (CN); Genggeng Peng, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/970,256

(22) Filed: Dec. 15, 2015

(65) Prior Publication Data
US 2016/0099889 A1    Apr. 7, 2016

Related U.S. Application Data (63) Continuation of application No. PCT/CN2014/083418, filed on Jul. 31, 2014.

(30) Foreign Application Priority Data

Aug. 1, 2013    (CN) .......................... 2013 1 0330551

(51) Int. Cl.
  *G06F 15/173*    (2006.01)
  *H04L 12/911*    (2013.01)
  *H04L 29/06*    (2006.01)

(52) U.S. Cl.
  CPC ........... *H04L 47/827* (2013.01); *H04L 47/822* (2013.01); *H04L 65/80* (2013.01)

(58) Field of Classification Search
  CPC .... H04L 47/827; H04L 47/822; H04L 65/80
  USPC .................................................. 709/200, 226
  See application file for complete search history.

(56) References Cited

U.S. PATENT DOCUMENTS

| 7,783,666 B1* | 8/2010 | Zhuge | ............... | G06F 17/30082 |
| | | | | 707/783 |
| 2003/0064730 A1* | 4/2003 | Chen | ..................... | H04W 72/10 |
| | | | | 455/453 |

(Continued)

FOREIGN PATENT DOCUMENTS

| CN | 1697511 A | 11/2005 |
| CN | 101365153 A | 2/2009 |

(Continued)

OTHER PUBLICATIONS

Tencent Technology, ISRWO, PCT/CN2014/082204, Oct. 22, 2014, 7 pgs.

(Continued)

*Primary Examiner* — Anthony Mejia
(74) *Attorney, Agent, or Firm* — Morgan, Lewis & Bockius LLP (57) ABSTRACT

A method of allocating network medium data resources is disclosed. The method is performed at an apparatus having one or more processors and memory for storing programs to be executed by the one or more processors. The method includes selecting, from a set of virtual requests, a virtual request including a requested resource usage time range consisting of multiple unit time periods. The method includes identifying a set of requests conflicting with the selected virtual request, where the set of conflicting requests includes one virtual request and one actual request. The method includes calculating, based on the set of conflicting requests, a maximum allocatable resource volume for each unit time period within the requested resource usage time range. The method further includes determining, based on the maximum allocatable resource volumes and the selected virtual request, an allocatable resource volume for each unit time period within the requested resource usage time.

20 Claims, 5 Drawing Sheets

(56) References Cited

U.S. PATENT DOCUMENTS

| | | | |
|---|---|---|---|
| 2004/0078778 A1* | 4/2004 | Leymann | G06F 9/50 717/105 |
| 2005/0033767 A1* | 2/2005 | Kamentz | G06F 9/44536 |
| 2005/0238153 A1* | 10/2005 | Chevalier | H04M 15/51 379/114.2 |
| 2007/0022425 A1* | 1/2007 | Jackson | G06F 9/5027 718/104 |
| 2008/0059215 A1 | 3/2008 | Boyd | |
| 2009/0012930 A1* | 1/2009 | Jackson | G06F 9/505 |
| 2009/0144732 A1* | 6/2009 | Tanaka | G06F 3/0613 718/1 |
| 2011/0040903 A1* | 2/2011 | Sterns | G06F 3/0607 710/39 |
| 2012/0054344 A1* | 3/2012 | Udani | H04L 12/5695 709/226 |
| 2012/0221706 A1* | 8/2012 | Westberg | H04L 12/5695 709/223 |
| 2013/0298134 A1* | 11/2013 | Jackson | G06F 9/505 718/104 |
| 2014/0258620 A1* | 9/2014 | Nagarajan | G06F 12/0815 711/120 |
| 2015/0148003 A1* | 5/2015 | Piro, Jr. | G06Q 30/04 455/406 |

FOREIGN PATENT DOCUMENTS

| | | |
|---|---|---|
| CN | 102542438 A | 7/2012 |
| CN | 106077468 A | 5/2013 |
| EP | 2565836 A1 | 3/2013 |

OTHER PUBLICATIONS

Tencent Technology, ISRWO, PCT/CN2014/083418, Nov. 6, 2014, 7 pgs.

* cited by examiner

METHOD AND APPARATUS FOR ALLOCATING NETWORK MEDIUM DATA RESOURCES

PRIORITY CLAIM AND RELATED APPLICATION

This application is a continuation application of PCT Patent Application No. PCT/CN2014/083418, entitled "METHOD AND APPARATUS FOR ALLOCATING NETWORK MEDIUM RESOURCES" filed on Jul. 31, 2014, which claims priority to Chinese Patent Application Serial No. 201310330551.X, entitled "Method and Apparatus for Allocating Network Medium Data Resources," filed on Aug. 1, 2013, both of which are incorporated herein by reference in their entirety. This application is related to U.S. patent application Ser. No. 14/970,213, entitled "METHOD AND APPARATUS FOR ALLOCATING NETWORK MEDIUM RESOURCES", filed on Dec. 15, 2015, which is incorporated herein by reference in its entirety.

FIELD OF THE APPLICATION

The present application generally relates to the field of Internet data processing technologies, and more particularly to a method and apparatus for allocating network medium data resources.

BACKGROUND

With the rapid development of Internet in recent years, technologies for processing and presenting network medium information have been widely implemented in various industries. Some known control systems allocate network medium data resources in the Internet based on requests made by users. Such known control systems usually receive various user requests at different times. In response to the received user requests, the known control systems typically allocate network medium data resources in a FCFS (first-come, first-served) manner, that is, allocating network medium data resources to a received user request without considering user requests that are expected in the future. Such a FCFS approach, however, does not provide a user with accurate information on allocatable network medium data resources until the user submits an actual request and the actual request is being processed. Thus, due to the dynamic nature of the allocation process, mismatches between user requests and actual allocatable resources are generated, potentially causing low efficiency in the allocation of resources and substantial waste of network medium data resources.

Therefore, a need exists for a method and apparatus that can accurately estimate allocatable network medium data resources without using an actual request, thus reducing mismatches between user requests and allocatable resources and improving utilization of available network medium data resources.

SUMMARY

The above deficiencies associated with the known control systems may be addressed by the techniques described herein.

In some embodiments, a method of allocating network medium data resources is disclosed. The method is performed at an apparatus having one or more processors and memory for storing programs to be executed by the one or more processors. The method includes receiving and storing a set of virtual requests for the network medium data resources. Each virtual request from the set of virtual requests includes a requested resource usage time range and at least one requested resource volume. The requested resource usage time range includes multiple unit time periods.

The method includes receiving an instruction selecting a virtual request from the set of virtual requests. In some instances, the selected virtual request includes at least one dimension of the network medium data resources that is one of a display position of the network medium data resources, gender of audience, age of audience, region of audience, time of display, scene of display, content of the network medium data resources, frequency of display, and duration of attached content.

The method includes identifying a set of requests that have conflicts with the selected virtual request, where the set of conflicting requests includes at least one virtual request from the set of virtual requests and at least one actual request from a set of existing actual requests for the network medium data resources. Each actual request from the set of existing actual requests includes an actual resource usage time range and at least one actual resource volume reserved for that actual request.

The method also includes calculating, based on existing information of the network medium data resources and the identified set of conflicting requests, a maximum allocatable resource volume for each unit time period within the requested resource usage time range for the selected virtual request.

In some instances, calculating the maximum allocatable resource volume for each unit time period within the requested resource usage time range includes 1) determining, based on the existing information of the network medium data resources and the selected virtual request, a total resource volume for that unit time period; 2) calculating, based on the identified set of conflicting requests, a conflict resource volume for that unit time period; and 3) assigning the difference between the total resource volume and the conflict resource volume to the maximum allocatable resource volume for that unit time period. Alternatively, in some other instances, the method includes comparing the calculated difference with a threshold of resource volume, and assigning the lower of the two values to the maximum allocatable resource volume for that unit time period. Additionally, in some instances, the method includes displaying the conflict resource volume, the total resource volume, and the maximum allocatable resource volume for each unit time period within the requested resource usage time range.

The method further includes determining, based on the calculated maximum allocatable resource volumes and the selected virtual request, an allocatable resource volume for each unit time period within the requested resource usage time range for the selected virtual request. In some instances, the sum of the allocatable storage volumes for all unit time periods within the requested resource usage time range for the selected virtual request is equal to a total requested resource volume included in the selected virtual request, and less than the sum of maximum allocatable resource volumes for all unit time periods within the requested resource usage time range for the selected virtual request.

In some instances, the selected virtual request includes a requested resource volume for each unit time period within the requested resource usage time range. The determining the allocatable resource volume for each unit time period within the requested resource usage time range for the selected virtual request includes calculating a difference between the requested resource volume and the maximum allocatable resource volume for each unit time period; and then determining, based on the calculated differences, the allocatable resource volume for each unit time period.

In some embodiments, an apparatus includes one or more processors and memory storing one or more programs for execution by the one or more processors. The one or more programs include instructions that cause the apparatus to perform the method for allocating network medium data resources as described above. In some embodiments, a non-transitory computer readable storage medium stores one or more programs including instructions for execution by one or more processors. The instructions, when executed by the one or more processors, cause the processors to perform the method for allocating network medium data resources at an apparatus as described above.

Various advantages of the present application are apparent in light of the descriptions below.

BRIEF DESCRIPTION OF DRAWINGS

The aforementioned implementation of the application as well as additional implementations will be more clearly understood as a result of the following detailed description of the various aspects of the application when taken in conjunction with the drawings.

FIG. 3 is a schematic diagram illustrating another user interface used in allocating network medium data resources in accordance with some embodiments.

Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In some embodiments, network medium data resources discussed herein can be calculated based on a common specific time cycle such as, for example, per hour, per day, per week, per month, etc. For example, an estimated volume of allocatable network medium data resources is an estimation of allocatable network medium data resources for a day; allocatable network medium data resources within a predefined geographical region are allocatable network medium data resources within that predefined geographical region for a week; allocatable network medium data resources associated with a predefined content are allocatable network medium data resources associated with that predefined content for an hour; a total volume of allocatable network medium data resources is a total volume of the allocatable network medium data resources for a day; and/or the like. In the following embodiments, for example, network medium data resources discussed herein are defined based on a per-day time cycle by default unless otherwise specified. Additionally, a unit used to measure the network medium data resources can be, for example, cost per mile (CPM) (i.e., the advertising cost per thousand views).

In order to make the objectives, technical solutions, and advantages of the present application comprehensible, embodiments of the present application are further described in detail below with reference to the accompanying drawings.

Figure 1:
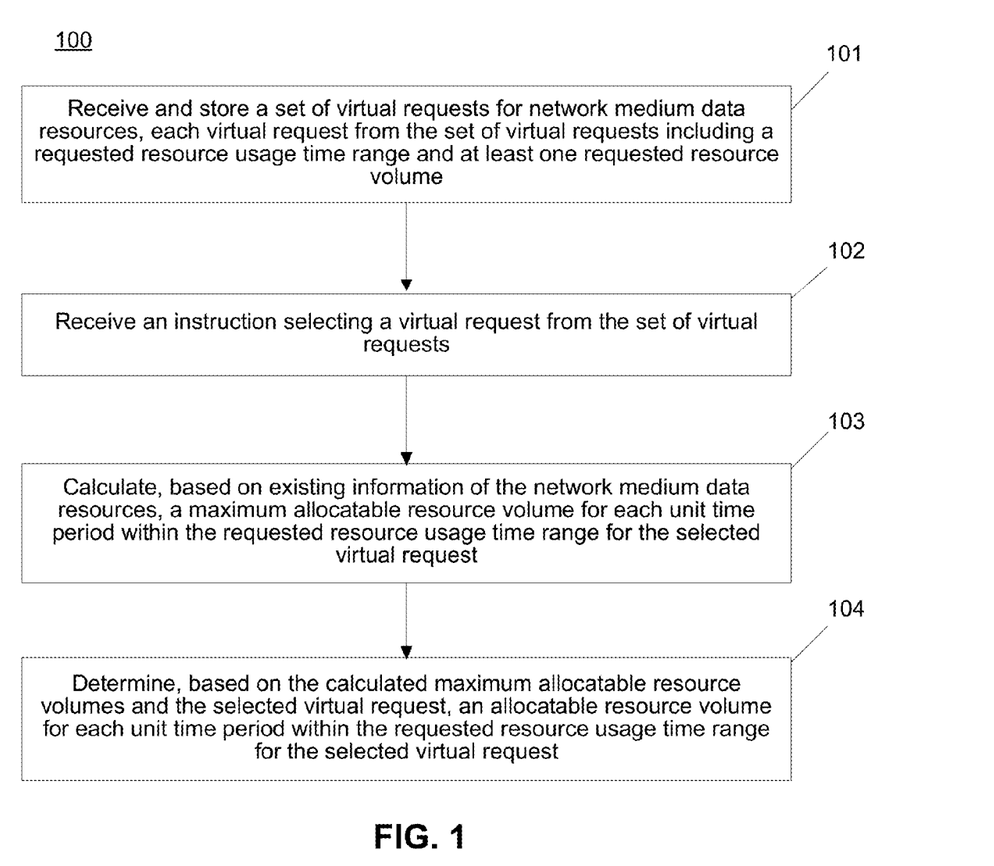
FIG. 1 is a flow chart illustrating a method performed at an apparatus for allocating network medium data resources in accordance with some embodiments.

FIG. 1 is a flow chart illustrating a method 100 performed at an apparatus for allocating network medium data resources in accordance with some embodiments. Such an apparatus can be configured to be operatively coupled to and communicate with one or more other devices such as, for example, a terminal device, a server device, another apparatus, etc. The apparatus can be configured to be operatively coupled to one or more networks such as, for example, the Internet. The apparatus can be operated by one or more users such as an operator or a network administrator. In some embodiments, the apparatus can be included in a single physical device. In other embodiments, the apparatus can include at least portions of multiple physical devices.

In some embodiments, the apparatus performing the method 100 can be any type of device that is configured to allocate network medium data resources. Specifically, as described in details herein, the apparatus can be configured to calculate an estimated volume of network medium data resources that are to be allocated to each unit time period (e.g., per day) within a requested resource usage time range. Such an apparatus can typically be configured to communicate with one or more devices (e.g., terminal devices, server devices, networking devices, other apparatuses, etc.) via one or more networks. In some embodiments, the apparatus can be, for example, a background server, a back end server, a database server, a workstation, a desktop computer, a cloud computing server, a data processing server, a personal computer, a smart phone, a mobile Internet device (MID), a personal digital assistant (PDA), a palmtop computer, a tablet computer, a laptop computer, a handheld computer, and/or the like. In some embodiments, the apparatus can be a cluster or data center consisting of two or more devices (e.g., a data processing server and a database server). Details of such an apparatus are shown and described below with respect to FIG. 5.

In some embodiments, a network operatively coupled to the apparatus performing the method 100 can be any type of network configured to operatively couple one or more such apparatuses to one or more other devices, and enable communications between the apparatus(es) and the connected device(s). In some embodiments, such a network can include one or more networks such as, for example, a cellular network, a satellite network, a local area network (LAN), a wide area network (WAN), a wireless local area network (WLAN), Internet, etc. In some embodiments, such a network can be optionally implemented using any known network protocol including various wired and/or wireless protocols such as, for example, Ethernet, universal serial bus (USB), global system for mobile communications (GSM), enhanced data GSM environment (EDGE), general packet radio service (GPRS), long term evolution (LTE), code division multiple access (CDMA), wideband code division multiple Access (WCDMA), time division multiple access (TDMA), Bluetooth, Wi-Fi, voice over internet protocol (VoIP), Wi-MAX, etc.

In some embodiments, the apparatus performing the method 100 can include one or more processors and memory. In such embodiments, the method 100 is governed by instructions or code of an application that are stored in a non-transitory computer readable storage medium of the apparatus and executed by the one or more processors of the apparatus. The application is associated with allocating network medium data resources. As a result of the application being executed at the one or more processors of the apparatus, the method 100 is performed at the apparatus. As shown in FIG. 1, the method 100 includes the following steps.

At 101, the apparatus receives and stores a set of virtual requests for network medium data resources. The set of virtual requests includes one or multiple virtual requests that are received from one or more users. In some embodiments, each virtual request from the set of virtual requests includes a requested resource usage time range and at least one requested resource volume. Such a requested resource usage time range can include multiple unit time periods, where a unit time period can be any suitable fixed length of time such as, for example, a day, an hour, 12 hours, a week, etc. For example, a virtual request includes a requested resource usage time range consisting of 10 consecutive days, where each day from the 10 consecutive days is one unit time period. For another example, a virtual request includes a requested resource usage time range consisting of 96 consecutive hours, where each unit time period is 12 consecutive hours. In such embodiments, each virtual request is sent by a user to query availability of network medium data resources that can potentially be allocated to each unit time period within the requested resource usage time range included in that virtual request.

Furthermore, in some embodiments, a virtual request from the set of virtual requests includes a set of requested resource volumes, where each requested resource volume from the set of requested resource volumes represents a specific demand of network medium data resources for each individual unit time period from the requested resource usage time range. In such embodiments, the requested resource volumes for different unit time periods from the requested resource usage time range can be the same or different from each other.

In some embodiments, a virtual request from the set of virtual requests includes a total requested resource volume, which represents a total demand of network medium data resources for the requested resource usage time range as a whole. In such embodiments, the total requested resource volume can be a sum of individual requested resource volumes from the set of requested resource volumes.

In some embodiments, a virtual request from the set of virtual requests includes one or more dimensions of the network medium data resources other than the requested resource volume and the requested resource usage time range. Such dimensions of the network medium data resources include, for example, display position of the network medium data resources, gender of audience, age of audience, region of audience, time of display, scene of display, content of the network medium data resources, frequency of display, duration of attached content, and/or the like.

In some embodiments, a virtual request can be one type of application request received and/or stored at the apparatus. The apparatus can also receive and/or store actual requests as the other type of application request. In some embodiments, application requests (e.g., actual requests, virtual requests) described herein can include order information (e.g., actual order information, virtual order information). In such embodiments, a virtual request described herein can include virtual order information, and a requested resource volume included in a virtual request can be a virtual requested resource volume of the virtual order included in the virtual request.

In some embodiments, allocatable network medium data resources discussed herein can be an inventory volume, which is associated with (e.g., refers to or measures) exposure of corresponding network medium data resources that are available to be presented to users. Such allocatable network medium data resources can be measured by, for example, a number of views by users on a video clip or an advertisement that contains corresponding content of the network medium data resources.

Figure 2:
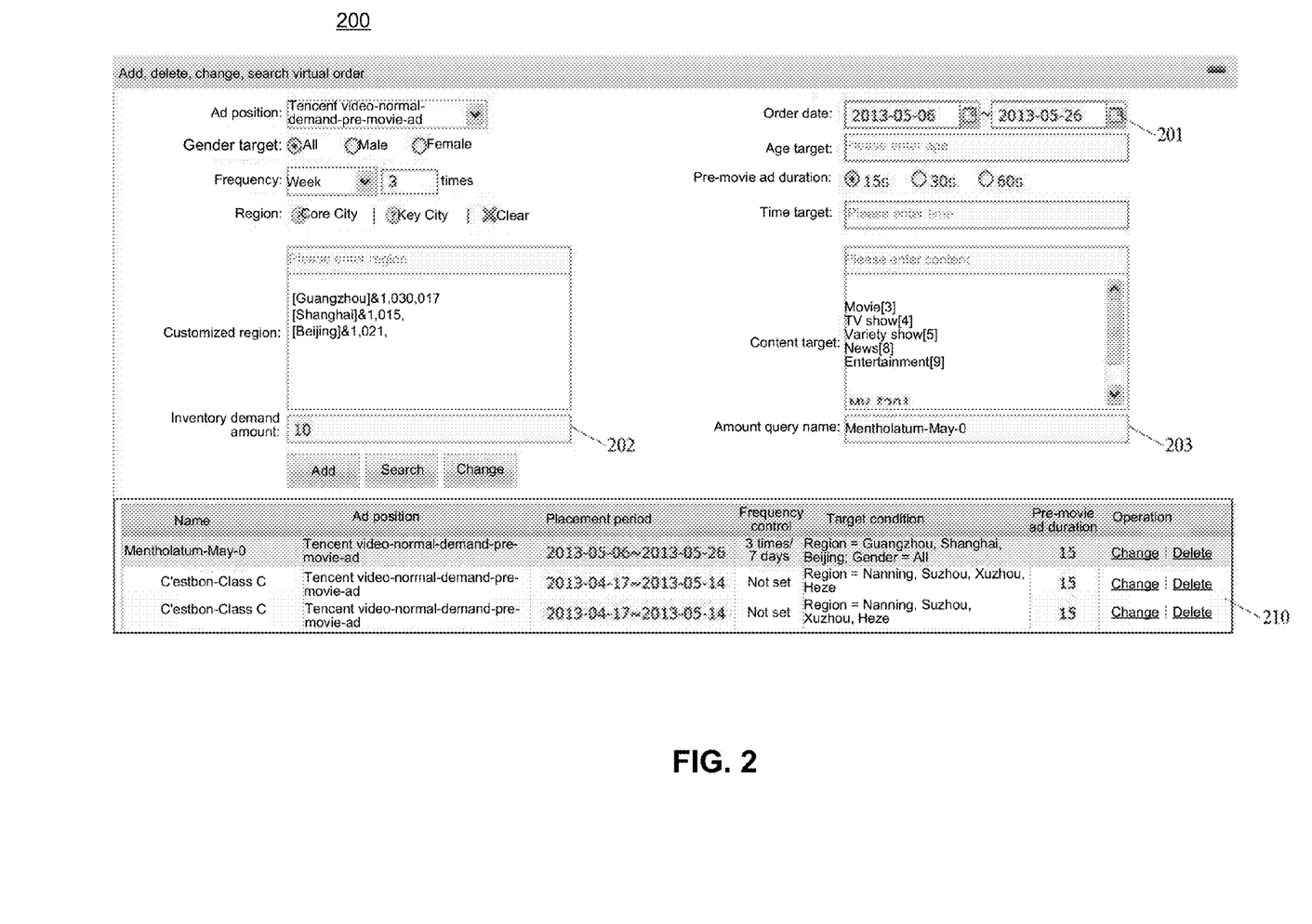
FIG. 2 is a schematic diagram illustrating a user interface used in allocating network medium data resources in accordance with some embodiments.

FIG. 2 is a schematic diagram illustrating a user interface 200 used in allocating network medium data resources in accordance with some embodiments. In some embodiments, the user interface 200 is used to define a virtual request. In such embodiments, the user interface 200 can be presented by the apparatus (e.g., displayed in a screen of the apparatus) performing the method 100 to a user, thus prompting the user to define a virtual request associated with querying allocatable network medium data resources within a certain period of time for a certain content. For example, the apparatus can display the user interface 200 in a screen of the apparatus, thus prompting the user to enter data defining dimensions of a virtual request.

As shown in FIG. 2, the virtual request defined at the user interface 200 includes multiple dimensions such as display position of the network medium data resources ("Ad position"), gender of audience ("Gender target"), frequency of display ("Frequency"), region of audience ("Region", "Customized region"), requested resource volume ("Inventory demand amount" at 202 in FIG. 2), requested resource usage time range ("Order date" at 201 in FIG. 2), age of audience ("Age target"), duration of attached content ("Pre-movie ad duration"), time of display ("Time target"), content of the network medium data resources ("Content target"), etc. Furthermore, the user interface 200 prompts the user to define a query name (e.g., "Mentholatum-May-0" at 203 in FIG. 2) for the virtual request, such that the user can use the same query name to identify and differentiate the specific virtual request from other application requests without providing detailed data of the specific virtual request.

As shown in FIG. 2, the user interface 200 also includes an "Add" button to add a new virtual request or store a newly-defined virtual request, a "Search" button to search a virtual request from the stored search requests (e.g., based on data entered into the fields of the user interface 200), and a "Change" button to modify entered data or edit a stored virtual request. Furthermore, the user interface 200 includes a display area 210 to display stored virtual requests. Each stored virtual request that is displayed in the area 210 can be selected by the user for further operation (e.g., modification, deletion, etc.)

Returning to FIG. 1, in some embodiments, the apparatus is configured to store and maintain data of virtual requests using data tables. Data elements of each virtual request that are stored in those data tables are listed in Tables 1 and 2 shown below. Specifically, Table 1 includes basic data elements of the virtual requests that are stored in those data tables. Table 2 includes data elements of the virtual requests representing information associated with a requested resource volume for one unit time period within the requested resource usage time range included in a virtual request. In other embodiments, the apparatus can be configured to store and maintain data of virtual requests using any other suitable data structure.

TABLE 1

| Data Elements | Data Type (Precision Range) | Constraint | Field Description |
| --- | --- | --- | --- |
| Fid | int(11) | AUTO_INCREMENT(key) | Automatic-incremented index number |
| Fquery_name | varchar(255) | NOT NULL | Name of virtual request |
| Fbegin_date | date | NOT NULL | Begin time of requested resource usage time range |
| Fend_date | date | NOT NULL | End time of requested resource usage time range |
| Flocation_id | char(30) | NOT NULL | Identifier for display position |
| Ftarget_info | mediumtext | NOT NULL | Dimensions |
| Ffreq_times | int(11) | NOT NULL | Frequency of display: number of times for display |
| Ffreq_period | int(11) | NOT NULL | Frequency of display: time period of display |
| Fplay_time | int(11) | NOT NULL | Duration of display |
| Fcontent_package | varchar(255) | NOT NULL | Content |
| Fenable | int(2) | NOT NULL | Validity (0: valid; 1: invalid) |

TABLE 2

| Data Elements | Data Type (Precision Range) | Constraint | Field Description |
| --- | --- | --- | --- |
| Fid | int(11) | AUTO_INCREMENT(key) | Automatic-incremented index number |
| Fquery_id | int(11) | NOT NULL | Index number of virtual request |
| Fschedule_day | date | NOT NULL | Order date of virtual request |
| Fsave_records | int(11) | NOT NULL | Requested resource volume for the current day |
| Fenable | int(2) | NOT NULL | Validity (0: valid; 1: invalid) |

After data of virtual requests are stored in the data tables according to the data elements listed in Tables 1 and 2, a user can select a virtual request from the stored virtual requests to query, to the apparatus, allocatable network medium data resources for the selected virtual request. In response, the apparatus is configured to perform 102-104 of the method 100 as follows.

At 102, the apparatus receives an instruction selecting a virtual request from the set of virtual requests. The user can select a virtual request from the set of virtual requests stored at the apparatus by selecting a virtual request listed in the display area 210 of the user interface 200. For example, in response to the user double-clicking a virtual request from the display area 210 to select that virtual request, the apparatus receives an instruction selecting that virtual request.

FIG. 3 is a schematic diagram illustrating a user interface 300 used in allocating network medium data resources in accordance with some embodiments. In some embodiments, the user interface 300 is used to display calculation results for a selected virtual request. Specifically, after a user selects a virtual request from the display area 210 in FIG. 2, the apparatus calculates allocation results for the selected virtual request, and then displays the calculated results in the user interface 300.

As shown in FIG. 3, the name of the selected virtual request (e.g., "Mentholatum-Shanghai-2[69]") is displayed at 301, and the requested resource usage time range of the selected virtual request is displayed at 302. Furthermore, the user interface 300 includes a "Search" button 300 to activate calculating allocated network medium data resources for the selected virtual request, as described in the following steps 103 and 104 of the method 100.

Specifically, at 103, the apparatus calculates, based on existing information of the network medium data resources, a maximum allocatable resource volume for each unit time period within the requested resource usage time range for the selected virtual request. Such a calculation can be performed in various suitable methods. In some embodiments, for example, the calculation of 103 can be performed in the following steps 311-314.

At 311, the apparatus calculates, based on existing information of the network medium data resources, a total resource volume for each unit time period within the requested resource usage time range for the selected virtual request. The calculated total volumes are displayed in row 303 of the user interface 300 in FIG. 3.

In some embodiments, the existing information of the network medium data resources includes an estimated total resource volume for each region from a set of predefined regions (e.g., big cities like New York, Los Angeles, Chicago, etc.), as well as an estimated total resource volume for each content from a set of predefined contents (e.g., TV episodes, movies, music videos, etc.). The existing information of the network medium data resources also includes a set of estimated ratios associated with other dimensions included in the virtual requests. In some embodiments, each estimated ratio from the set of estimated ratios represents an estimated ratio of resource volume associated with the associated dimension(s) over the total resource volume for a given region and/or a given content, which can both be obtained from the existing information of the network medium data resources.

In some embodiments, the set of estimated ratios includes an estimated ratio associated with a single dimension such as, for example, a time range, a frequency of display, characteristics of audience (e.g., age, region, gender of audience), a content, a display scene, etc. In some other embodiments, the set of estimated ratios includes an estimated ratio associated with a combination of multiple dimensions such as, for example, a certain group of audience from a specific region, a particular type of content with a specific frequency of display, etc.

In some embodiments, for example, a total resource volume for a unit time period from the requested resource usage time range of a virtual request can be calculated as a product of an estimated total resource volume (e.g., for a specific region and/or associated with a specific content) with one or more estimated ratios associated with other dimension(s).

At 312, the apparatus determines, from a set of stored actual requests, actual request(s) that have at least one overlap (e.g., in requested resource usage time range, in targeted audience, in targeted region, etc.) with the selected virtual request.

At 313, the apparatus calculates, based on existing information of the network medium data resources, a conflict resource volume between the selected virtual request and each determined conflicting actual request for each unit time period from the requested resource usage time range of the selected virtual request. The calculated conflict resource volumes are displayed in section 304 of the user interface 300 in FIG. 3. Furthermore, the apparatus adds up the calculated conflict resource volumes associated with each conflicting actual request to obtain a total conflict resource volume for each unit time period from the requested resource usage time range of the selected virtual request.

The conflict resource volume between a virtual request and an actual request can be calculated in various suitable methods. For example, a virtual request includes dimensions such as "New York," "female," and "three times per week." A stored actual request includes dimensions such as "New York," "TV episodes," and "200 CPM." Thus, the conflict resource volume between the virtual request and the actual request for each unit time period can be calculated as a product of 1) 200 CPM (as the estimated total resource volume), 2) an estimated ratio of network medium data resources for TV episodes watched by female audience from New York over network medium data resources for TV episodes watched by all audience from New York, and 3) an estimated ratio of network medium data resources for displaying at the frequency of three times a week over network medium data resources for displaying at all frequencies.

At 314, the apparatus calculates a remaining resource volume for each unit time period from the requested resource usage time range of the selected virtual request by subtracting the total conflict resource volume for that unit time period (calculated at 313) from the total resource volume for that unit time period (calculated at 311). The apparatus further assigns the calculated remaining resource volume for each unit time period to be a maximum allocatable resource volume for that unit time period. The calculated maximum allocatable resource volumes are displayed in row 305 of the user interface 300 in FIG. 3.

In some embodiments, the user can evaluate the selected virtual request based on the calculated maximum allocatable resource volumes for the selected virtual request (e.g., as displayed in row 305). Particularly, the user can evaluate the requested resource volume and the requested resource usage time range of the selected virtual request. In some embodiments, if the user determines that the calculated maximum allocatable resource volumes do not satisfy (e.g., are less than) the corresponding requested resource volumes included in the selected virtual request, the user can modify or change the selected virtual request and then re-calculate maximum allocatable resource volumes for the modified or replaced virtual request. For example, the user can modify the requested resource volumes, requested resource usage time range, and/or other dimensions of the selected virtual request using the user interface 200 in FIG. 2. The user can then click the "Recalculate" button 306 to activate the recalculation. Alternatively, the user can select another virtual request by manipulating the text box 301. The user can then click the "Recalculate" button 306 to activate the recalculation. In such embodiments, no actual request is generated and no actual resource is used or allocated into the network. As a result, waste of actual network medium data resources can be avoided, thus lowering cost of maintain and improving efficiency of operation.

In some embodiments, as described above with respect to the steps 311-314, only actual requests are considered in calculating conflict resource volumes for the selected virtual request. In some other embodiments, both actual requests and other virtual requests from the set of stored virtual requests can be considered in calculating conflict resource volumes for the selected virtual request. In such embodiments, for example, the calculation of 103 can be performed in the following steps 321-325.

At 321, similar to the step 311 described above, the apparatus calculates, based on existing information of the network medium data resources, a total resource volume for each unit time period within the requested resource usage time range for the selected virtual request. The calculated total volumes are displayed in row 303 of the user interface 300 in FIG. 3.

At 322, the apparatus receives an instruction selecting one or more other virtual requests from the set of stored virtual requests. The other virtual request(s) that are selected at 322 will be included in calculating conflict resource volumes for the virtual request that is previously selected at 102. As shown in FIG. 3, the table 307 in the user interface 300 displays virtual requests that are received and stored at the apparatus, including the virtual request previously selected (i.e., "Mentholatum-Shanghai-2" displayed in the first row of the table 307). The user can select one or more other virtual requests displayed in the table 307 by checking the corresponding boxes in the second column "Selected" of the table 307. For instance, all of the other eight virtual requests are selected in the table 307 in FIG. 3.

At 323, similar to the step 312, the apparatus determines, from the set of stored actual requests and the selected other virtual request(s), application request(s) that have at least one overlap (e.g., in requested resource usage time range, in targeted audience, in targeted region, etc.) with the initially-selected virtual request. The determined application request(s) can include actual request(s) and/or virtual request(s).

At 324, the apparatus calculates, based on existing information of the network medium data resources, a total conflict resource volume between the initially-selected virtual request and each determined conflicting request (a conflicting actual request or a conflicting virtual request) for each unit time period from the requested resource usage time range of the initially-selected virtual request. Operations of the step 324 are similar to the operations of the step 313 described above.

At 325, the apparatus calculates maximum allocatable resource volumes for the initially-selected virtual request based on the total resource volumes calculated at 321 and the total conflict resource volumes calculated at 324. Specifically, similar to the step 314 described above, the apparatus calculates a maximum allocatable resource volume for a unit time period for the initially-selected virtual request by subtracting the calculated total conflict resource volume for that unit time period from the calculated total resource volume for that unit time period. In other words, the maximum allocatable resource volume is a residual resource volume. Operations of the step 325 are similar to the operations of the step 314 described above.

The calculated maximum allocatable resource volumes are displayed in row 308 of the user interface 300 in FIG. 3. Note that the maximum allocatable resource volumes displayed in row 305 ("Maximum allocatable resource volume") are calculated based on conflicting actual requests only, while the maximum allocatable resource volumes displayed in row 308 ("Maximum allocatable resource volume (virtual)") are calculated based on both conflicting actual requests and conflicting virtual requests. Therefore, the maximum allocatable resource volumes displayed in row 305 are generally greater than the corresponding maximum allocatable resource volumes displayed in 308 (i.e., in the same column, or in other words, for the same unit time period).

In some embodiments, the user can evaluate the initially-selected virtual request based on the maximum allocatable resource volumes calculated for the initially-selected virtual request based on conflicting actual and virtual requests (e.g., as displayed in row 308). Particularly, the user can evaluate the requested resource volume and the requested resource usage time range of the initially-selected virtual request. In some embodiments, if the user determines that the calculated maximum allocatable resource volumes do not satisfy (e.g., are less than) the corresponding requested resource volumes included in the initially-selected virtual request, the user can modify or change the initially-selected virtual request and then re-calculate maximum allocatable resource volumes for the modified or replaced virtual request. For example, the user can modify the requested resource volumes, requested resource usage time range, and/or other dimensions of the initially-selected virtual request using the user interface 200 in FIG. 2. The user can then click the "Recalculate" button 306 to activate the recalculation. Alternatively, the user can select another virtual request by manipulating the text box 301, and then click the "Recalculate" button 306 to activate the recalculation. Optionally, the user can also change the selection of the other virtual requests in the table 307, and then click the "Recalculate" button 306 to activate the recalculation. In such embodiments, no actual request is generated and no actual resource is used or allocated into the network. As a result, waste of actual network medium data resources can be avoided, thus lowering cost of maintain and improving efficiency of operation.

In some embodiments, as described above, the maximum allocatable resource volume for a unit time period is calculated as the difference between the total resource volume for that unit time period and the total conflict resource volume for that unit time period. In some other embodiments, a control system of network medium data resources imposes a restriction on allocatable network medium data resources. Such a restriction can be, for example, a threshold of resource volume that is an upper limit for a total resource volume of the allocatable network medium data resources. For example, the control system specifies that the same clip cannot be played at more than one position attached to any given piece of network medium content. That is, among the multiple clips (e.g., three clips) attached to a piece of content (e.g., a TV episode, a video clip), the same clip can be played at most once. As a result, the maximum allocatable resource volume is calculated based on the residual resource volume calculated at 325 (i.e., the difference between the corresponding total resource volume calculated at 321 and the corresponding total conflict resource volume calculated at 324) and the restriction (e.g., a threshold of resource volume). For example, the maximum allocatable resource volume is the minimum of the residual resource volume calculated at 325 and a threshold of resource volume (e.g., a predefined threshold).

In some embodiments, the apparatus further calculates and displays an allocating ratio for each unit time period (e.g., in rows 309, 310 of the user interface 300), which is calculated as: one minus a ratio of a corresponding maximum allocatable resource volume for that unit time period over the total resource volume for that unit time period. In some embodiments, an allocating ratio is calculated based on conflicting actual requests only as: one minus a ratio of the maximum allocatable resource volume calculated based on conflicting actual requests only (at step 314) over the calculated total resource volume (at step 311). Such allocating ratios are displayed in row 309 ("Allocating ratio (actual)"). In some other embodiments, an allocating ratio is calculated based on both conflicting actual requests and conflicting virtual requests as: one minus a ratio of the maximum allocatable resource volume calculated based on both conflicting actual requests and conflicting virtual requests (at step 325) over the calculated total resource volume (at step 321). Such allocating ratios are displayed in row 310 ("Allocating ratio (virtual)").

Similarly stated, for each column corresponding to a unit time period within the requested resource usage time range of the selected virtual request, allocating ratio (actual) in row 309=1−maximum allocatable resource volume in row 305/total resource volume in row 303; and similarly, allocating ratio (virtual) in row 310=1−maximum allocatable resource volume (virtual) in row 308/total resource volume in row 303.

In some embodiments, the user can activate a process for intelligently allocating network medium data resources by, for example, clicking the "Intelligent allocation" button 311 in the user interface 300. As a result, the step 104 of the method 100 is performed. Specifically, at 104, the apparatus determines, based on the calculated maximum allocatable resource volumes and the selected virtual request, an allocatable resource volume for each unit time period within the requested resource usage time range for the selected virtual request. In some embodiments, for example, the intelligent allocation of the step 104 can be performed in the following steps 141-142.

At 141, the apparatus compares, for each unit time period, a requested resource volume for that unit time period with a calculated maximum allocatable resource volume for that unit time period (calculated in step 103 as described above). The apparatus then calculates the difference between the requested resource volume and the maximum allocatable resource volume for each unit time period. If the requested resource volume is greater than the maximum allocatable resource volume, the calculated difference represents an insufficient resource volume; if the requested resource volume is less than the maximum allocatable resource volume, the calculated difference represents an extra resource volume; if the requested resource volume is equal to the maximum allocatable resource volume, the calculated difference is zero and represents a match between demand and supply.

Furthermore, the apparatus calculates a total insufficient resource volume of the requested resource usage time range by adding up all insufficient resource volumes calculated for the unit time periods within the requested resource usage time range. Similarly, the apparatus calculates a total extra resource volume of the requested resource usage time range by adding up all extra resource volumes calculated for the unit time periods within the requested resource usage time range.

At 142, if the calculated total insufficient resource volume is less than the calculated total extra resource volume, then the apparatus distributes the extra resource volume evenly among the unit time periods having extra resource volume until the distributed extra resource volume equals the total insufficient resource volume. If the calculated total insufficient resource volume is greater than the calculated total extra resource volume, then the apparatus first allocates the extra resource volume to the unit time period having the minimum insufficient resource volume, then allocates the remaining extra resource volume to the unit time period having the second minimum insufficient resource volume, so on and so forth until all the total extra resource volume is allocated. If the calculated total insufficient resource volume is equal to the calculated total extra resource volume, then the apparatus distributes the total extra resource volume among all the unit time periods having insufficient resource volume such that each unit time period has exactly the corresponding requested resource volume.

For example, Table 3 compares traditional allocation result with intelligent allocation result for a requested resource usage time range of five days (i.e., 05-01 to 05-05). As shown in Table 3, the first row ("Requested resource volume") shows requested resource volume for each unit time period (i.e., day); the second row ("Maximum allocatable resource volume") shows calculated maximum allocatable resource volume for each unit time period; the third row ("Traditional allocation result") shows allocatable resource volume for each unit time period after performing the traditional allocation; and the fourth row ("Intelligent allocation result") shows allocatable resource volume for each unit time period after performing the intelligent allocation described herein.

TABLE 3

| Description | Date | | | | | Total |
| --- | --- | --- | --- | --- | --- | --- |
| | 05-01 | 05-02 | 05-03 | 05-04 | 05-05 | |
| Requested resource volume | 100 | 100 | 100 | 100 | 100 | 500 |
| Maximum allocatable resource volume | 130 | 70 | 160 | 80 | 110 | 550 |
| Traditional allocation result | 100 | 70 | 100 | 80 | 100 | 450 |
| Intelligent allocation result | 120 | 70 | 120 | 80 | 110 | 500 |

As shown in Table 3, the unit time periods 05-01, 05-03 and 05-05 have extra resource volumes 30 (which is calculated by 130–100), 60 (which is calculated by 160–100), and 10 (which is calculated by 110–100), respectively; and the unit time periods 05-02, 05-04 have insufficient resource volumes 30 (which is calculated by 100–70) and 20 (which is calculated by 100–80), respectively. According to the traditional allocation approach, the allocatable resource volume for a unit time period is the minimum of the requested resource volume for that unit time period and the maximum allocatable resource volume for that unit time period. Thus, the results for the five unit time periods are 100 (which is the minimum of 100 and 130), 70 (which is the minimum of 100 and 70), 100 (which is the minimum of 100 and 160), 80 (which is the minimum of 100 and 80), and 100 (which is the minimum of 100 and 110), respectively. However, such a traditional allocation approach ignores the extra resource volumes.

In performing the intelligent allocation, the apparatus establishes and maintains two arrays: array A for the extra resource volumes and array B for the insufficient resource volumes. The apparatus rearranges the extra resource volumes in array A in the ascending order (i.e., from small to large), and rearranges the insufficient resource volumes in array B in the descending order (i.e., from large to small). As shown in Table 3, the total extra resource volume is 100 (i.e., sum of 30, 60 and 10), and the total insufficient resource volume is 50 (i.e., sum of 30 and 20). The total insufficient resource volume is less than the total extra resource volume. Thus, the apparatus distributes the extra resource volume evenly among the unit time periods having extra resource volume until the distributed extra resource volume equals the total insufficient resource volume.

Figure 4:
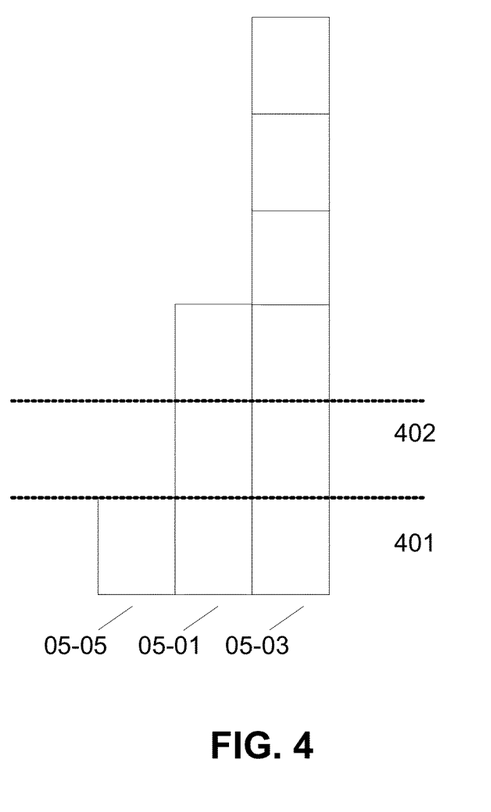
FIG. 4 is a schematic diagram illustrating a mechanism used in allocating network medium data resources in accordance with some embodiments.

FIG. 4 is a schematic diagram illustrating a mechanism used in allocating network medium data resources for the example of Table 3. As shown in FIG. 4, the three columns have a height of 10, 30 and 60, respectively, which represents the corresponding extra resource volumes of the three unit time periods 05-05, 05-01 and 05-03, respectively. First, the extra resource volume of 30 in the section 401 is evenly distributed among the three unit time periods having extra resource volume. Thus, an extra resource volume of 10 is distributed to each of 05-05, 05-01 and 05-03. The extra resource volume that has been distributed is 30, which is less than the total insufficient resource volume (i.e., 50). Second, after the section 401 is distributed, the extra resource volume of 05-05 is completely depleted, and the remaining extra resource volumes in array A are 20 (calculated as 30–10 for 05-01) and 50 (calculated as 60–10 for 05-03). Meanwhile, the remaining total insufficient resource volume is updated to be 20 (calculated as 50–30). Third, the remaining extra resource volume in array A is evenly distributed among the remaining unit time periods (i.e., 05-01 and 05-03) up to the point that is equal to the remaining insufficient resource volume (i.e., 20). Thus, an extra resource volume of 10 is distributed to 05-01 and another extra resource volume of 10 is distributed to 05-03.

Overall, the result is that an extra resource volume of 10 is distributed to 05-05 (in the first step); an extra resource volume of 20 is distributed to 05-01 (10 in the first step and another 10 in the second step); and an extra resource volume of 20 is distributed to 05-03 (10 in the first step and another 10 in the second step). The total extra resource volume being distributed is 50, which is equal to the total insufficient resource volume. The result of such an intelligent allocation process is shown in the last row ("Intelligent allocation result") of Table 3.

For another example, in Table 4, the unit time periods 05-02, 05-04 and 05-05 have extra resource volumes 10 (which is calculated by 110–100), 20 (which is calculated by 120–100), and 10 (which is calculated by 110–100), respectively; and the unit time periods 05-01, 05-03 have insufficient resource volumes 30 (which is calculated by 100–70) and 50 (which is calculated by 100–50), respectively. According to the traditional allocation approach, the allocatable resource volume for a unit time period is the minimum of the requested resource volume for that unit time period and the maximum allocatable resource volume for that unit time period. Thus, the results for the five unit time periods are 70 (which is the minimum of 100 and 70), 100 (which is the minimum of 100 and 110), 50 (which is the minimum of 100 and 50), 100 (which is the minimum of 100 and 120), and 100 (which is the minimum of 100 and 110), respectively.

TABLE 4

| Description | Date | | | | | Total |
|---|---|---|---|---|---|---|
| | 05-01 | 05-02 | 05-03 | 05-04 | 05-05 | |
| Requested resource volume | 100 | 100 | 100 | 100 | 100 | 500 |
| Maximum allocatable resource volume | 70 | 110 | 50 | 120 | 110 | 460 |
| Traditional allocation result | 70 | 100 | 50 | 100 | 100 | 420 |
| Intelligent allocation result | 100 | 100 | 60 | 100 | 100 | 460 |

In performing the intelligent allocation, the total extra resource volume is 40 (i.e., sum of 10, 20 and 10), and the total insufficient resource volume is 80 (i.e., sum of 30 and 50). The total insufficient resource volume is greater than the total extra resource volume. Thus, the apparatus first allocates the extra resource volume to the unit time period having the minimum insufficient resource volume, which is 05-01. Because the total extra resource volume (i.e., 40) is greater than the insufficient resource volume of 05-01 (i.e., 30), the resource volume allocated to 05-01 is increased by 30, from 70 to 100, and the remaining total extra resource volume is brought down from 40 to 10. The apparatus then allocates the remaining extra resource volume to the unit time period having the second minimum insufficient resource volume, which is 05-03. Because the remaining total extra resource volume (i.e., 10) is less than the insufficient resource volume of 05-03 (i.e., 50), the resource volume allocated to 05-03 is increased by 10, from 50 to 60. The allocatable resource volumes for 05-02, 05-04 and 05-05 are reduced accordingly. The result of such an intelligent allocation process is shown in the last row ("Intelligent allocation result") of Table 4.

In some embodiments, if the user is not satisfied with the intelligent allocation result, the user can manually change the allocation and then store the changed allocation. In some embodiments, if the total resource volume for allocatable network medium data resources associated with the requested resource usage time range of a selected virtual request, the apparatus can be configured to release additional network medium data resources by, for example, adjusting allocation of resource volumes for other virtual requests, canceling actual requests that have already been processed, and/or the like. The released additional network medium data resources can then be included in the total resource volume to satisfy the requested resource volume of the selected virtual request.

Figure 5:
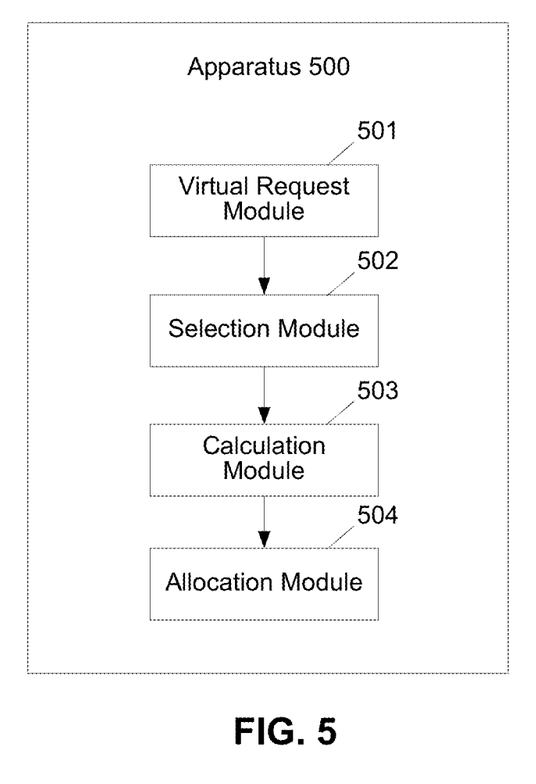
FIG. 5 is a block diagram illustrating modules of an apparatus configured to allocate network medium data resources in accordance with some embodiments.

FIG. 5 is a block diagram illustrating modules of an apparatus 500 configured to allocate network medium data resources in accordance with some embodiments. The apparatus 500 can be structurally and functionally similar to the apparatus performing the method 100 described above with respect to FIGS. 1-4. As shown in FIG. 5, the apparatus 500 includes a virtual request module 501, a selection module 502, a calculation module 503 and an allocation module 504. In some embodiments, an apparatus can include more or less modules than those shown in FIG. 5.

In some embodiments, each module included in the apparatus 500 can be a hardware-based module (e.g., a digital signal processor (DSP), an application-specific integrated circuit (ASIC), a field programmable gate array (FPGA), etc.), a software-based module (e.g., a module of computer code executed at a processor, a set of processor-readable instructions executed at a processor, etc.), or a combination of hardware and software modules. Instructions or code of each module can be stored in a memory of the apparatus 500 (not shown in FIG. 5) and executed at a processor (e.g., a CPU) of the apparatus 500 (not shown in FIG. 5). Overall, the virtual request module 501, the selection module 502, the calculation module 503 and the allocation module 504 can be configured to collectively perform the method 100 shown and described above with respect to FIGS. 1-4. In other words, the virtual request module 501, the selection module 502, the calculation module 503 and the allocation module 504 can be configured to allocate network medium data resources.

Specifically, the virtual request module 501 is configured to, among other functions, receive and/or store one or more virtual requests for network medium data resources. Each virtual request received and/or stored at the virtual request module 501 includes a requested resource usage time range, at least one requested resource volume, and/or other dimensions of the network medium data resources (e.g., display position of the network medium data resources, gender of audience, age of audience, region of audience, time of display, scene of display, content of the network medium data resources, frequency of display, duration of attached content, etc.). In some embodiments, the virtual request module 501 is configured to perform operations of the step 101 of the method 100 shown and described with respect to FIG. 1.

The selection module 502 is configured to, among other functions, receive instructions selecting a virtual request from the virtual requests received and/or stored at the virtual request module 501. For example, as shown in FIG. 2, a user can select a virtual request from a set of virtual requests stored at an apparatus (e.g., the apparatus 500) by selecting a virtual request listed in the display area 210 of the user interface 200. In some embodiments, the selection module 502 is configured to perform operations of the step 102 of the method 100 shown and described with respect to FIG. 1.

The calculation module 503 is configured to, among other functions, calculate a maximum allocatable resource volume for each unit time period within the requested resource usage time range of a virtual request selected by the selection module 502. In some embodiments, the calculation module 503 is configured to perform operations of the step 103 of the method 100 shown and described with respect to FIG. 1.

In some embodiments, although not shown in FIG. 5, the calculation module 503 includes a total-resource-volume-calculation submodule, a conflicting-actual-request submodule, a conflict-volume-calculation submodule, and a maximum-allocatable-resource-volume-calculation submodule.

The total-resource-volume-calculation submodule is configured to perform operations of the step 311 to calculate a total resource volume for each unit time period within the requested resource usage time range of the virtual request selected by the selection module 502. The conflicting-actual-request submodule is configured to perform operations of the step 312 to determine, from actual requests stored at the apparatus 500, each actual request that has conflict with the virtual request selected by the selection module 502. The conflict-volume-calculation submodule is configured to perform operations of the step 313 to calculate a conflict resource volume between the virtual request selected by the selection module 502 and each conflicting actual request determined by the conflicting-actual-request submodule. The maximum-allocatable-resource-volume-calculation submodule is configured to perform operations of the step 314 to calculate a remaining resource volume for each unit time period from the requested resource usage time range of the virtual request selected by the selection module 502. The calculated remaining resource volume is used as the desired maximum allocatable resource volume for that unit time period.

In some other embodiments, although not shown in FIG. 5, the calculation module 503 includes a total-resource-volume-calculation submodule, a selection submodule, a conflicting-all-request submodule, a conflict-volume-calculation submodule, and a maximum-allocatable-resource-volume-calculation submodule.

The total-resource-volume-calculation submodule is configured to perform operations of the step 321 to calculate a total resource volume for each unit time period within the requested resource usage time range of the virtual request selected by the selection module 502. The selection submodule is configured to perform operations of the step 322 to receive an instruction selecting one or more other virtual requests stored by the virtual request module 501. The conflicting-all-request submodule is configured to perform operations of the step 323 to determine, from both actual requests and virtual requests selected by the selection submodule, each actual request or selected virtual request that has conflict with the virtual request initially selected by the selection module 502. The conflict-volume-calculation submodule is configured to perform operations of the step 324 to calculate a conflict resource volume between the virtual request selected by the selection module 502 and each conflicting actual or virtual request determined by the conflicting-all-request submodule. The maximum-allocatable-resource-volume-calculation submodule is configured to perform operations of the step 325 to calculate a remaining resource volume for each unit time period from the requested resource usage time range of the virtual request selected by the selection module 502. The calculated remaining resource volume is used as the desired maximum allocatable resource volume for that unit time period.

In some embodiments, the maximum-allocatable-resource-volume-calculation submodule described above is also configured to determine a threshold of resource volume that is an upper limit for a total resource volume of the allocatable network medium data resources. In such embodiments, the maximum-allocatable-resource-volume-calculation submodule is configured to calculate the maximum allocatable resource volume for each unit time period as the minimum of a residual resource volume (calculated at 325 or 314) and the determined threshold of resource volume.

In some embodiments, the calculation module 503 includes an allocating-ratio-calculation submodule configured to calculate an allocating ratio for each unit time period as described above. In some embodiments, the apparatus 500 includes a display module (not shown in FIG. 5) configured to display values associated with allocating network medium data resources such as, for example, the total resource volume, the conflict resource volume, the maximum allocatable resource volume, and/or the allocating ratio for each unit time period within the requested resource usage time range of the virtual request selected by the selection module 502.

The allocation module 504 is configured to, among other functions, determines an allocatable resource volume for each unit time period within the requested resource usage time range of the virtual request selected by the selection module 502. In some embodiments, the allocation module 504 is configured to perform operations of the step 104 of the method 100 shown and described with respect to FIG. 1.

In some embodiments, although not shown in FIG. 5, the allocation module 504 includes a difference-calculation submodule and an allocation submodule. The difference-calculation submodule is configured to perform operations of the step 141 to calculate an extra resource volume or an insufficient resource volume for each unit time period as described above. The allocation submodule is configured to perform operations of the step 142 to implement the intelligent allocation for determining a final allocatable resource volume of network medium data resources for each unit time period as described above.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of allocating network medium data resources, comprising:
    at an apparatus having one or more processors and memory for storing programs to be executed by the one or more processors:
        receiving and storing a set of virtual requests for the network medium data resources, each virtual request from the set of virtual requests including a requested resource usage time range and at least one requested resource volume, the requested resource usage time range including a plurality of unit time periods;
        receiving an instruction selecting a virtual request from the set of virtual requests;
        identifying a set of requests that have conflicts with the selected virtual request, the set of conflicting requests including at least one virtual request from the set of virtual requests and at least one actual request from a set of existing actual requests for the network medium data resources, each actual request from the set of existing actual requests including an actual resource usage time range and at least one actual resource volume reserved for that actual request;
        calculating, based on existing information of the network medium data resources and the identified set of conflicting requests, a maximum allocatable resource volume for each unit time period within the requested resource usage time range for the selected virtual request; and
        determining, based on the calculated maximum allocatable resource volumes and the selected virtual request, an allocatable resource volume for each unit time period within the requested resource usage time range for the selected virtual request.

2. The method of claim 1, wherein the selected virtual request includes at least one dimension of the network medium data resources that is one of a display position of the network medium data resources, gender of audience, age of audience, region of audience, time of display, scene of display, content of the network medium data resources, frequency of display, and duration of attached content.

3. The method of claim 1, wherein the sum of the allocatable storage volumes for all unit time periods within the requested resource usage time range for the selected virtual request is equal to a total requested resource volume included in the selected virtual request.

4. The method of claim 1, wherein the sum of allocatable storage volumes for all unit time periods within the requested resource usage time range for the selected virtual request is less than the sum of maximum allocatable resource volumes for all unit time periods within the requested resource usage time range for the selected virtual request.

5. The method of claim 1, wherein calculating the maximum allocatable resource volume for each unit time period within the requested resource usage time range includes:
    determining, based on the existing information of the network medium data resources and the selected virtual request, a total resource volume for each unit time period within the requested resource usage time range;
    calculating, based on the identified set of conflicting requests, a conflict resource volume for each unit time period within the requested resource usage time range; and
    assigning the difference between the total resource volume and the conflict resource volume for each unit time period within the requested resource usage time range to the maximum allocatable resource volume for that unit time period.

6. The method of claim 5, further comprising:
    displaying the conflict resource volume, the total resource volume, and the maximum allocatable resource volume for each unit time period within the requested resource usage time range.

7. The method of claim 1, wherein calculating the maximum allocatable resource volume for each unit time period within the requested resource usage time range includes:
  determining, based on the existing information of the network medium data resources and the selected virtual request, a total resource volume for each unit time period within the requested resource usage time range;
  calculating, based on the identified set of conflicting requests, a conflict resource volume for each unit time period within the requested resource usage time range;
  calculating the difference between the total resource volume and the conflict resource volume for each unit time period within the requested resource usage time range;
  determining a threshold of resource volume for each unit time period within the requested resource usage time range; and
  assigning the lower of the calculated difference and the determined threshold of resource volume for each unit time period within the requested resource usage time range to the maximum allocatable resource volume for that unit time period.

8. The method of claim 1, wherein the selected virtual request includes a requested resource volume for each unit time period within the requested resource usage time range for the selected virtual request, determining the allocatable resource volume for each unit time period within the requested resource usage time range for the selected virtual request includes:
  calculating a difference between the requested resource volume and the maximum allocatable resource volume for each unit time period within the requested resource usage time range; and
  determining, based on the calculated differences, the allocatable resource volume for each unit time period within the requested resource usage time range.

9. An apparatus, comprising:
  one or more processors; and
  memory storing one or more programs to be executed by the one or more processors, the one or more programs comprising instructions for:
    receiving and storing a set of virtual requests for the network medium data resources, each virtual request from the set of virtual requests including a requested resource usage time range and at least one requested resource volume, the requested resource usage time range including a plurality of unit time periods;
    receiving an instruction selecting a virtual request from the set of virtual requests;
    identifying a set of requests that have conflicts with the selected virtual request, the set of conflicting requests including at least one virtual request from the set of virtual requests and at least one actual request from a set of existing actual requests for the network medium data resources, each actual request from the set of existing actual requests including an actual resource usage time range and at least one actual resource volume reserved for that actual request;
    calculating, based on existing information of the network medium data resources and the identified set of conflicting requests, a maximum allocatable resource volume for each unit time period within the requested resource usage time range for the selected virtual request; and
    determining, based on the calculated maximum allocatable resource volumes and the selected virtual request, an allocatable resource volume for each unit time period within the requested resource usage time range for the selected virtual request.

10. The apparatus of claim 9, wherein the selected virtual request includes at least one dimension of the network medium data resources that is one of a display position of the network medium data resources, gender of audience, age of audience, region of audience, time of display, scene of display, content of the network medium data resources, frequency of display, and duration of attached content.

11. The apparatus of claim 9, wherein the sum of the allocatable storage volumes for all unit time periods within the requested resource usage time range for the selected virtual request is equal to a total requested resource volume included in the selected virtual request.

12. The apparatus of claim 9, wherein the sum of allocatable storage volumes for all unit time periods within the requested resource usage time range for the selected virtual request is less than the sum of maximum allocatable resource volumes for all unit time periods within the requested resource usage time range for the selected virtual request.

13. The apparatus of claim 9, wherein calculating the maximum allocatable resource volume for each unit time period within the requested resource usage time range includes:
  determining, based on the existing information of the network medium data resources and the selected virtual request, a total resource volume for each unit time period within the requested resource usage time range;
  calculating, based on the identified set of conflicting requests, a conflict resource volume for each unit time period within the requested resource usage time range; and
  assigning the difference between the total resource volume and the conflict resource volume for each unit time period within the requested resource usage time range to the maximum allocatable resource volume for that unit time period.

14. The apparatus of claim 13, the one or more programs further comprising instructions for:
  displaying the conflict resource volume, the total resource volume, and the maximum allocatable resource volume for each unit time period within the requested resource usage time range.

15. The apparatus of claim 9, wherein calculating the maximum allocatable resource volume for each unit time period within the requested resource usage time range includes:
  determining, based on the existing information of the network medium data resources and the selected virtual request, a total resource volume for each unit time period within the requested resource usage time range;
  calculating, based on the identified set of conflicting requests, a conflict resource volume for each unit time period within the requested resource usage time range;
  calculating the difference between the total resource volume and the conflict resource volume for each unit time period within the requested resource usage time range;
  determining a threshold of resource volume for each unit time period within the requested resource usage time range; and
  assigning the lower of the calculated difference and the determined threshold of resource volume for each unit time period within the requested resource usage time range to the maximum allocatable resource volume for that unit time period.

16. The apparatus of claim 9, wherein the selected virtual request includes a requested resource volume for each unit time period within the requested resource usage time range for the selected virtual request, determining the allocatable resource volume for each unit time period within the requested resource usage time range for the selected virtual request includes:
- calculating a difference between the requested resource volume and the maximum allocatable resource volume for each unit time period within the requested resource usage time range; and
- determining, based on the calculated differences, the allocatable resource volume for each unit time period within the requested resource usage time range.

17. A non-transitory computer readable storage medium storing one or more programs, the one or more programs comprising instructions, which, when executed by one or more processors, cause the processors to perform operations comprising:
at an apparatus:
- receiving and storing a set of virtual requests for the network medium data resources, each virtual request from the set of virtual requests including a requested resource usage time range and at least one requested resource volume, the requested resource usage time range including a plurality of unit time periods;
- receiving an instruction selecting a virtual request from the set of virtual requests;
- identifying a set of requests that have conflicts with the selected virtual request, the set of conflicting requests including at least one virtual request from the set of virtual requests and at least one actual request from a set of existing actual requests for the network medium data resources, each actual request from the set of existing actual requests including an actual resource usage time range and at least one actual resource volume reserved for that actual request;
- calculating, based on existing information of the network medium data resources and the identified set of conflicting requests, a maximum allocatable resource volume for each unit time period within the requested resource usage time range for the selected virtual request; and
- determining, based on the calculated maximum allocatable resource volumes and the selected virtual request, an allocatable resource volume for each unit time period within the requested resource usage time range for the selected virtual request.

18. The non-transitory computer readable storage medium of claim 17, wherein calculating the maximum allocatable resource volume for each unit time period within the requested resource usage time range includes:
- determining, based on the existing information of the network medium data resources and the selected virtual request, a total resource volume for each unit time period within the requested resource usage time range;
- calculating, based on the identified set of conflicting requests, a conflict resource volume for each unit time period within the requested resource usage time range; and
- assigning the difference between the total resource volume and the conflict resource volume for each unit time period within the requested resource usage time range to the maximum allocatable resource volume for that unit time period.

19. The non-transitory computer readable storage medium of claim 17, wherein calculating the maximum allocatable resource volume for each unit time period within the requested resource usage time range includes:
- determining, based on the existing information of the network medium data resources and the selected virtual request, a total resource volume for each unit time period within the requested resource usage time range;
- calculating, based on the identified set of conflicting requests, a conflict resource volume for each unit time period within the requested resource usage time range;
- calculating the difference between the total resource volume and the conflict resource volume for each unit time period within the requested resource usage time range;
- determining a threshold of resource volume for each unit time period within the requested resource usage time range; and
- assigning the lower of the calculated difference and the determined threshold of resource volume for each unit time period within the requested resource usage time range to the maximum allocatable resource volume for that unit time period.

20. The non-transitory computer readable storage medium of claim 17, wherein the selected virtual request includes a requested resource volume for each unit time period within the requested resource usage time range for the selected virtual request, determining the allocatable resource volume for each unit time period within the requested resource usage time range for the selected virtual request includes:
- calculating a difference between the requested resource volume and the maximum allocatable resource volume for each unit time period within the requested resource usage time range; and
- determining, based on the calculated differences, the allocatable resource volume for each unit time period within the requested resource usage time range.

* * * * *